United States Patent
Raghunathan et al.

(10) Patent No.: US 9,824,321 B2
(45) Date of Patent: Nov. 21, 2017

(54) SYSTEM AND METHOD FOR CATEGORIZATION OF SOCIAL MEDIA CONVERSATION FOR RESPONSE MANAGEMENT

(71) Applicant: Infosys Limited, Bangalore (IN)

(72) Inventors: Balaji Raghunathan, Bangalore (IN); Sivaram Thangam Varghese, Tamilnadu (IN); Prasanna Nagesh Teli, Kolhapur (IN)

(73) Assignee: Infosys Limited, Bangalore (IN)

( * ) Notice: Subject to any disclaimer, the term of this patent is extended or adjusted under 35 U.S.C. 154(b) by 532 days.

(21) Appl. No.: 14/490,068

(22) Filed: Sep. 18, 2014

(65) Prior Publication Data

US 2015/0088593 A1 Mar. 26, 2015

(30) Foreign Application Priority Data

Sep. 20, 2013 (IN) .......................... 4259/CHE/2013

(51) Int. Cl.
*G06Q 10/00* (2012.01)
*G06Q 10/06* (2012.01)
(Continued)

(52) U.S. Cl.
CPC ......... *G06Q 10/0633* (2013.01); *G06Q 50/01* (2013.01); *H04L 51/32* (2013.01)

(58) Field of Classification Search
CPC ..... G06Q 10/0633; G06Q 10/00; G06Q 50/01
(Continued)

(56) References Cited

U.S. PATENT DOCUMENTS 7,130,807 B1 * 10/2006 Mikurak ............... G06Q 10/06
705/7.25
7,133,834 B1 * 11/2006 Abelow ............... G06Q 10/101
705/1.1
(Continued)

FOREIGN PATENT DOCUMENTS

WO WO 2011072125 6/2011

OTHER PUBLICATIONS

"Social Media and Business Intelligence," http://blogs.communitiesrus.in/communityconnect/2011/07/12/social-media-and-business-intelligence/, downloaded Sep. 17, 2014, 7 pages.
(Continued)

*Primary Examiner* — Romain Jeanty
(74) *Attorney, Agent, or Firm* — Klarquist Sparkman, LLP (57) ABSTRACT

A computer implemented method for customer response management the method comprising the step of collecting information from social networking sites wherein the information is at least a post or comment for at least a brand or product; identifying customer among pluralities of authors of the information on the social networking sites; categorizing the information into at least a complaint, lead, service request, information request or feedback; analyzing the categorized information; prioritizing the analyzed information; and routing the prioritized information to at least a concerned personnel or a work flow of the Customer Relationship Management (CRM) system for response. The method further comprising identifying the influence of the customer wherein the influence is at least a global influence or local influence. The identification of customer is done by fetching information from at least the Customer Relationship Management (CRM) system or social profile aggregator service.

20 Claims, 9 Drawing Sheets

(51) Int. Cl.
*G06Q 50/00* (2012.01)
*H04L 12/58* (2006.01)
(58) Field of Classification Search
USPC .................................................... 705/7.27
See application file for complete search history.

(56) References Cited

U.S. PATENT DOCUMENTS

| | | | | |
|---|---|---|---|---|
| 7,222,078 | B2* | 5/2007 | Abelow | G06Q 10/0639 705/1.1 |
| 8,316,005 | B2* | 11/2012 | Moore | G06F 8/36 707/707 |
| 8,909,771 | B2* | 12/2014 | Heath | G06Q 30/02 705/39 |
| 9,092,802 | B1* | 7/2015 | Akella | G06Q 30/0256 |
| 2004/0227395 | A1* | 11/2004 | Katae | B60B 35/08 301/124.1 |
| 2007/0043632 | A1* | 2/2007 | Abelow | G06Q 10/101 705/26.8 |
| 2010/0017394 | A1* | 1/2010 | Terada | G06F 17/30864 707/E17.044 |
| 2010/0070485 | A1 | 3/2010 | Parsons et al. | |
| 2011/0145064 | A1 | 6/2011 | Anderson et al. | |
| 2011/0276513 | A1 | 11/2011 | Erhart et al. | |
| 2011/0288897 | A1 | 11/2011 | Erhart et al. | |
| 2011/0307312 | A1 | 12/2011 | Goeldi | |
| 2012/0047219 | A1 | 2/2012 | Feng et al. | |

OTHER PUBLICATIONS

"Salesforce Takes Enterprise Social Media Marketing to the Cloud," http://www.destinationcrm.com/Articles/CRM-News/Daily-News/Salesforce-Takes-Enterprise-Social-Media-Marketing-to-the-Cloud---79166.aspx, posted Nov. 30, 2011, 2 pages.
"Can Real-Time Social Analytics Provide Early Indications of Business Results?" http://www.socialmediatoday.com/content/can-real-time-social-analytics-provide-early-indications-business-results, posted Jan. 12, 2012, 3 pages.
Roberts, "What's the Last-Minute Social Shopper Interested in Buying?" http://socialmediatoday.com/jennifer-roberts/411096/what-s-last-minute-social-shopper-interested-buying, Dec. 22, 2011, 21 pages.

* cited by examiner

Buzzword and sentiment analysis

SYSTEM AND METHOD FOR CATEGORIZATION OF SOCIAL MEDIA CONVERSATION FOR RESPONSE MANAGEMENT

FIELD OF INVENTION

The invention relates to categorization of social media conversation and a system and method for categorization of social media conversation for prioritization of customer response management in particular.

BACKGROUND

Existing technology listens, monitors or analyzes conversations and discussions in the social media and generates sentiments and buzzwords for specific brands or product. However they do not categorize social media conversations based upon sentiments and buzzwords into functional categories like Sales, Marketing, Customer Service, Support or Product Recommendation requests for Specific products. At present only a fraction of social media conversations are relevant to enterprises. Inability to categorize conversations results in significant amount of monitoring effort in order to respond to those conversations. In addition, customers are not automatically identified and influencers are not identified as per relevant parameters of the enterprise. Traditional enterprise customer relation management (CRM) systems do not categorize social profile of the customers. Response management in prior arts does not have automated ways of routing the social conversation to the concerned CRM system.

There are no tool with the intelligence to identify customers and relevant influencers from the pool of users on social media and prioritize the posts or discussion of users on social media for customer response management which need intervention by the enterprise.

SUMMARY OF INVENTION

Accordingly there is need of system and method which can categorize the social media conversations and prioritize the categorized conversations for customer response management based upon plurality of categories comprising business function comprising Sales leads, Marketing requests, Customer requests, Support needs or Product Recommendation requests for a brand or product.

It is an object to categorize the social media conversation about at least a brand or products based upon business functions.

It is another object to prioritize the categorized social media conversation for customer response management.

It is another object to identify the customers among users of social media network.

Still another object to prioritize the social media conversation based upon attributes like influence and sentiment of the post.

Still further another objective to provide response management to the customers in accordance with the social media conversation.

Yet another object is to route the categorized conversation to the relevant functional group within the enterprise for customer response management.

While systems and methods are described herein by way of example and embodiments, those skilled in the art recognize that systems and methods for categorization of social media conversation for prioritization of customer response management are not limited to the embodiments or the diagrams described. It should be understood that 'web based platform', 'web based environment', 'social networking site', 'social web based platform', 'networking sites' and 'social sites' may be used interchangeably. As used herein, 'social user', 'social web users', 'online social content community' and 'social contacts' are the users of social networking sites unless indicated otherwise. The words 'categorization and 'classification' can be used interchangeably. It should be understood that drawings and descriptions are not intended to be limiting to the particular form disclosed. The word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments provide computer-implemented method, system and computer readable media for categorization of social media conversation for prioritization of customer response management.

Figure 1:
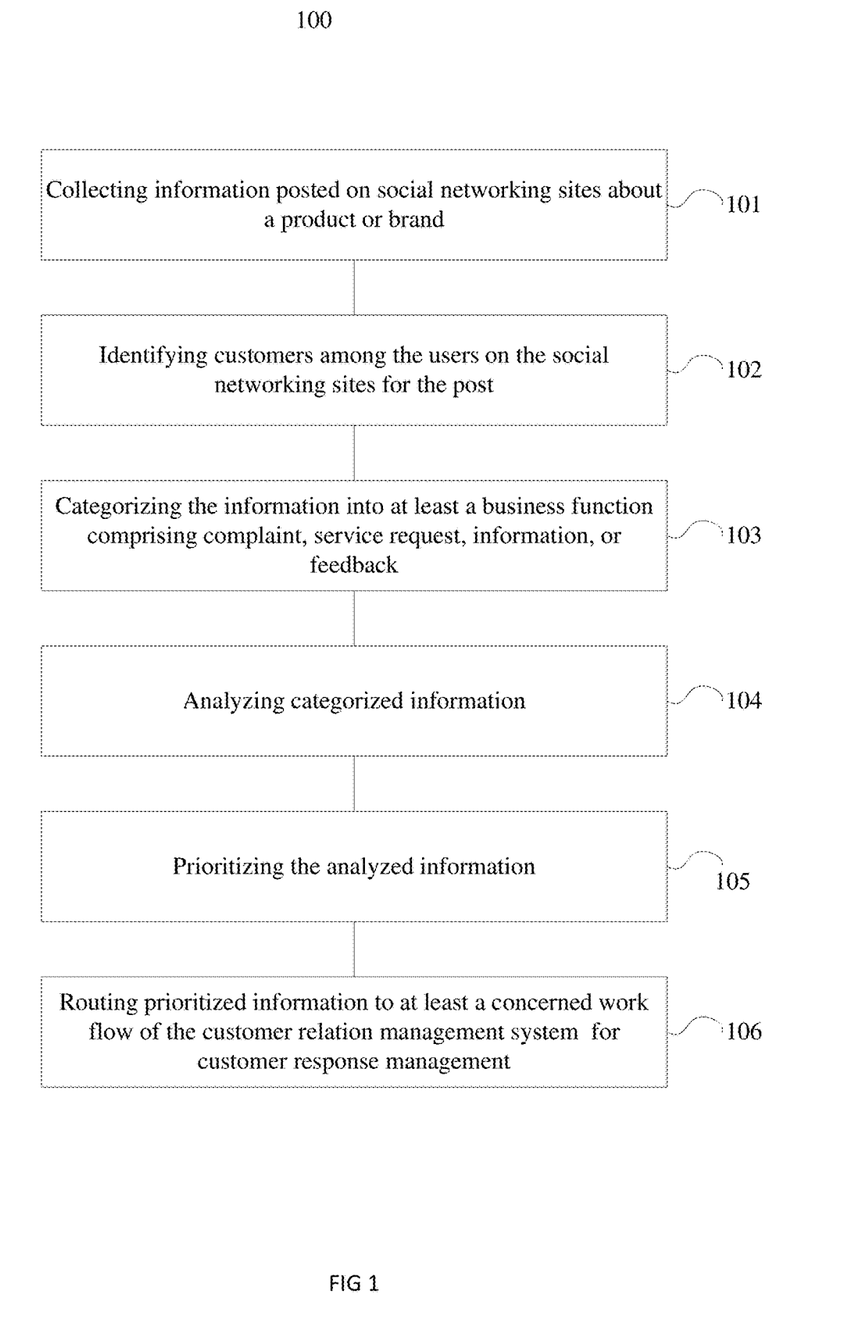
FIG. 1 shows an exemplary process flow for categorizing and prioritizing social media conversation on social networking sites for customer response management.

FIG. 1 shows an exemplary process flow for categorizing and prioritizing social media conversation for customer response management. According to an embodiment the method of categorizing and prioritizing the information available on social networking site for customer response management comprises of steps; collecting information from social networking sites about a product or brand 101, identifying customers among the authors of the post 102, categorizing information into at least a complaint, service request, information or feedback 103, analyzing categorized information 104, prioritizing the analyzed information 105, routing prioritized information to at least a concerned personnel or a work flow of the customer relation management system for response 106.

Figure 2:
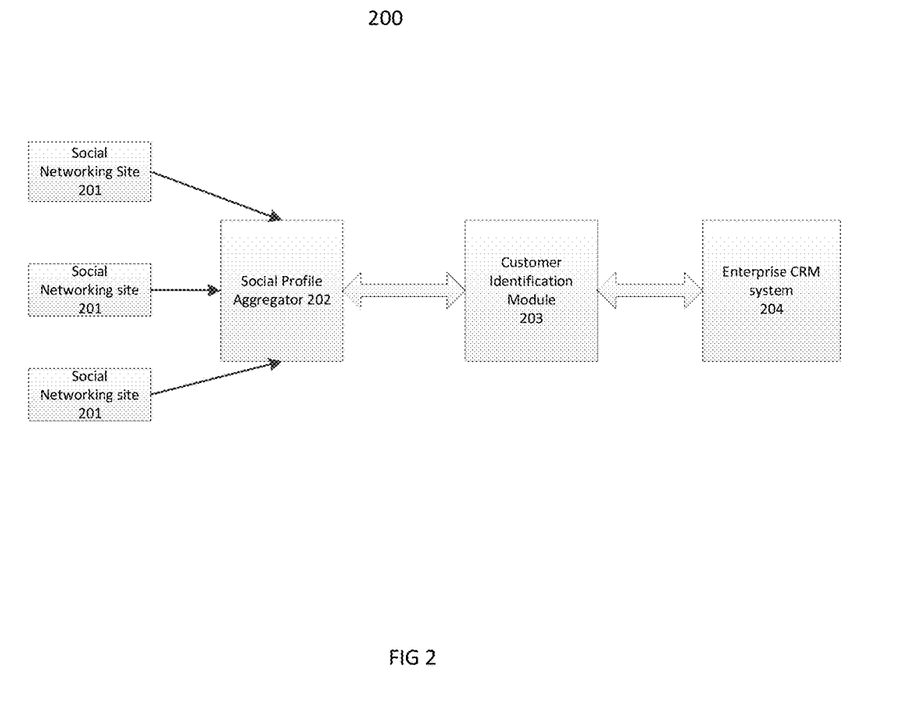
FIG. 2 shows an exemplary architecture for identifying customer among users of the social networking sites.

FIG. 2 shows an exemplary architecture for identifying customer in social media. According to an embodiment the system for identifying customer in social media comprises of social profile aggregator 202, customer identification module 203, and enterprise CRM system 204. According an embodiment during the process of registration with the enterprise the users are prompted to register at least one of their social networking site identities. The social networking site identities include but is not limited to name, users email identity and user-id of a social networking site. In the enterprise, customer profile information is stored in a separate system called as customer profile repository. Customer specific systems like CRM depend on the customer profile repository for master customer data. The registration of a customer with the enterprise system is done in a guided manner using social widgets provided by the social networking sites 201. This facilitates capturing the identity of the user in social media and mapping it to the information available in enterprise system. The enterprise system is any customer facing system which connects to the customer profile repository. The social profile aggregator 202 identifies the customer in social networking site 201 based upon the users credentials provided in the enterprise system. The users credentials includes but is not limited to emailed, user id on various social media channels like twitter, facebook and blogs. The social profile aggregator 202 may be queried with one or combination of the users credentials to reveals the probable account details of the user in social networking sites 201. The social profile aggregator 202 collects data related to users from social media channels and creates a unified profile. The unified profile is created using technologies comprising crawling and linking. Further validation is done to ensure that the mapping of the users' credentials with the users profile on social networking sites is correct. Validation is done using data validation techniques comprising of semi-automated or automated manner. Customer identification module 203 identifies the customer among the users of social media channels. According to an embodiment the author of the post is user of a social networking site 201.

According to an embodiment data from social networking sites can be gathered by leveraging Application Programming Interface (APIs) of the social networking sites. Data from blogs and discussion forum can be gathered using crawlers. This data can then be converted to the format as required by analytics tool by adaptors. Accordingly adaptors are site specific. It leverages Application Programming Interface (API) to fetch data from social sites and converts it to a format required by downstream components.

Figure 3:
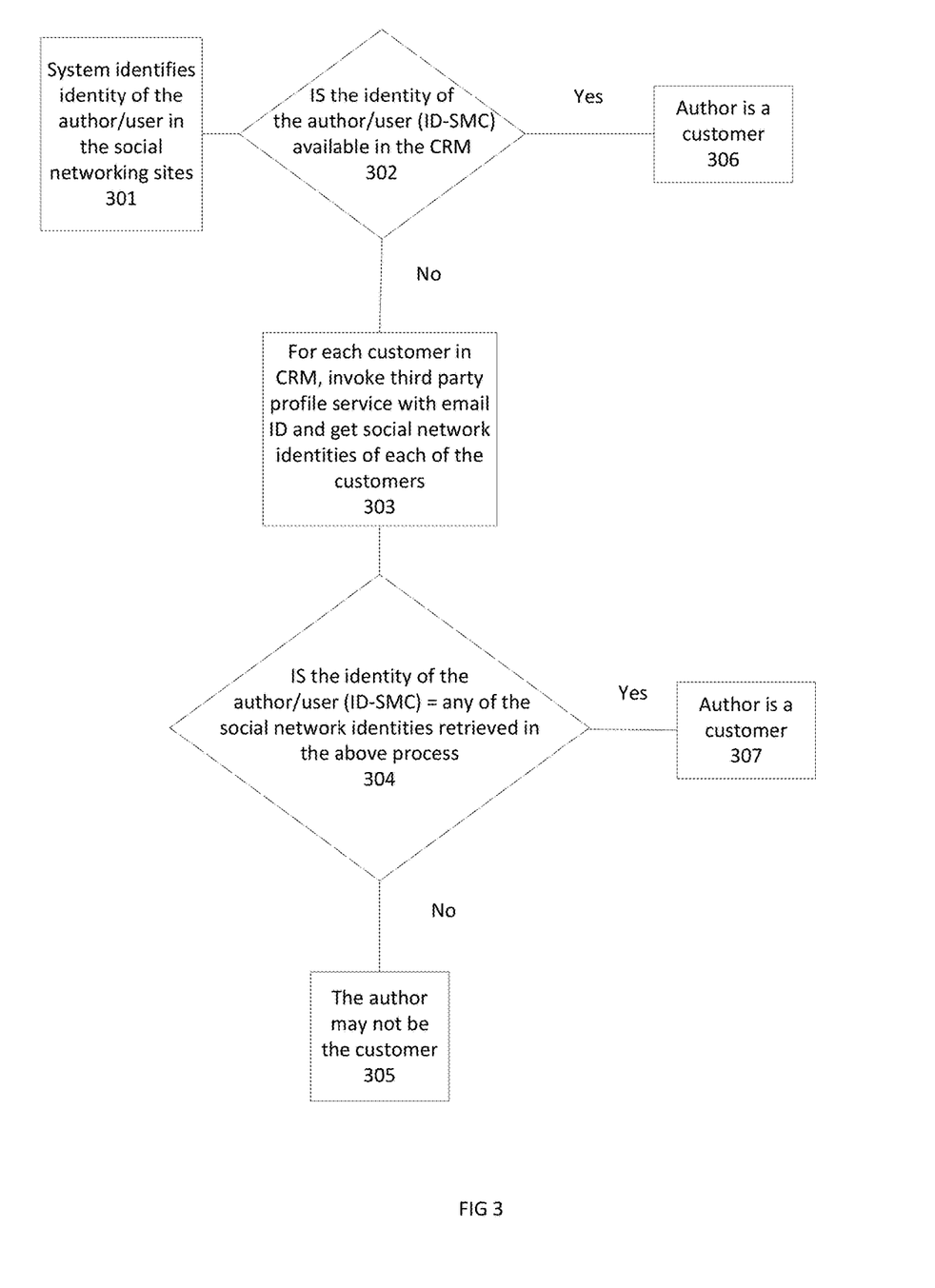
FIG. 3 shows an exemplary process flow for identification of the customers among users of social networking sites.

FIG. 3 shows an exemplary process flow for identification of customers from social networking sites. According to an embodiment once the user in the social networking sites is identified, the identified users profile is matched against the customers profile stored at the enterprise end. The customer identification module 203 identifies if identity of the user is available in CRM system step 302, the user is the customer, step 306. If the identity of the user is not available in the enterprise CRM system 204 then for each of the customers profile or credentials present with enterprise CRM system 204 a plurality of social networking sites are invoked using the customers profile or credentials of the customer available with the enterprise CRM system 204 to get the social network identities of the user, step 303. At this step social profile aggregator 202 aggregates the user's information from the plurality of social networking sites 201. Social profile aggregator is an independent web service which provides the social identities of a user when an online identity like email id of the user is provided. If the customer profile matches with at least the social network identity of a user the user is identified as the customer, step 307. But if the customer profile does not match the social network identity of the user it may not be identified as the customer. This process of collecting social ids of customers can be a batch process which can be scheduled to run periodically or can be an online backend process. This batch process invokes 3rd party social aggregator service for every customer using their email ids to collect their available social identity information.

Figure 4:
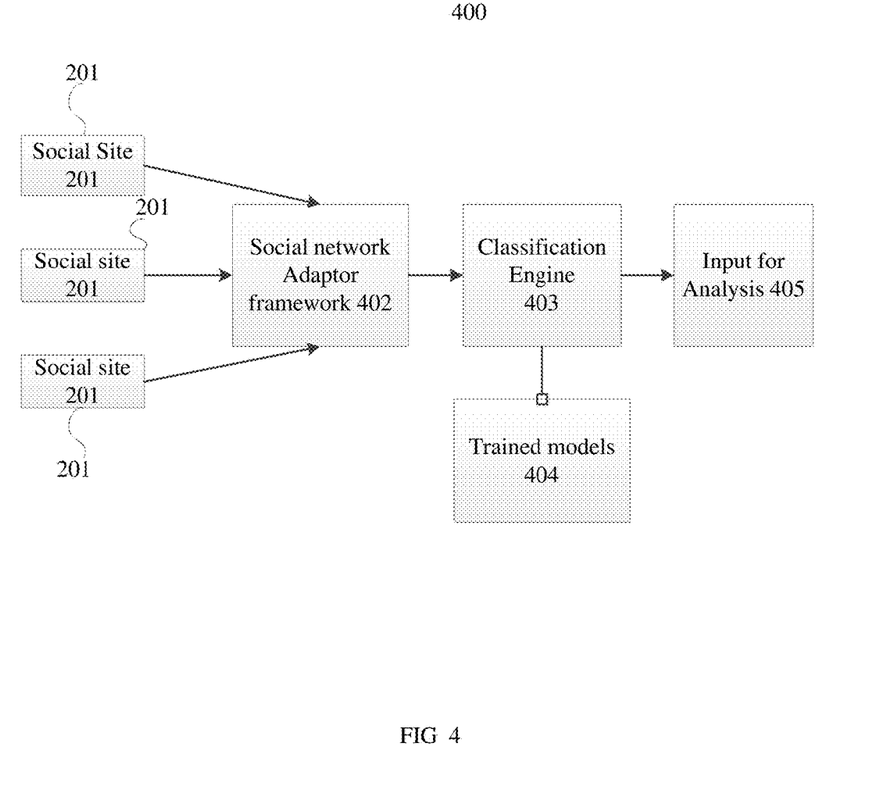
FIG. 4 shows an exemplary architecture for categorizing the information on social networking sites.

FIG. 4 shows an exemplary architecture for categorizing the information. Social network Adaptor framework 402 fetches the information from social networking sites 201. The fetched information is routed to Classification engine 403. The Classification engine is key component for classification of the information. The classification engine works on trained model 404 wherein the trained Model 404 is the definition based on which data will be classified. The classified information will be fed into downstream component for further analysis as input for analysis 405. Machine learning based classification approach can be used for classifying the posts fetched from social sites into categories including but not limiting to sale lead, customer complaint, information request or feedback. This approach comprises building and training machine learning based mathematical models for each of the categories and deploying it in classification engine. The given post can further be classified based on the taxonomy to link it to at least one of the products or brand or area. Taxonomy is a hierarchical structure defined by the user to make the system aware about the products or services being offered with their attributes and their relationships. The model typically contains mathematical expressions along with data attributes. This model is derived using data mining technique by training it with known set of inputs and outputs. The model can be imported into the classifier engine using standards like Predictive Model Markup Language (PMML).

According to an embodiment the information or content available on the social networking sites 201 is categorized into different categories including but not limiting to business function, campaign, and brand and product level. For categorization or classification of information available on the social networking sites a machine learning approach may be used. A plurality of machine learning approaches can be used for categorization of information, the approaches comprising design time configuration workbench and 'runtime-categorization binaries, semi-supervised machine learning, semantic algorithms. Further the machine learning approach is used to assign tags to the content or information available on the social networking sites. Further the tags are assigned after the content is being extracted from the social networking sites using the crawlers and saved for further processing. The tags can be used further to identify if the contents or the information needs to be classified into the categories including but not limiting to customer service, query, support, sales and marketing.

Figure 5:
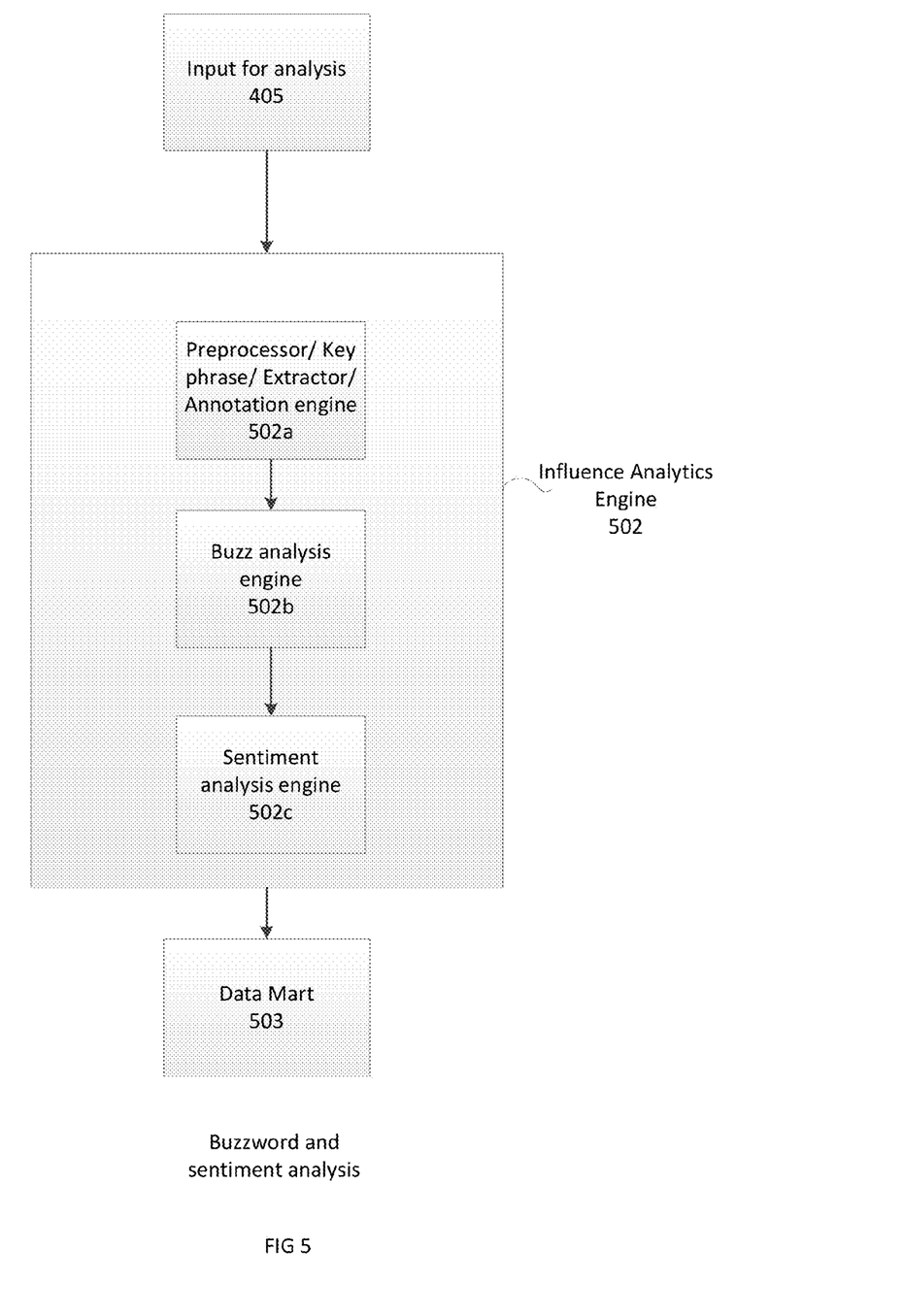
FIG. 5 shows an exemplary architecture of analyzing buzzword and sentiment of the information.

FIG. 5 shows an exemplary architecture of analyzing buzzword and sentiment of the post or information on the social networking sites 201. According to an embodiment input for analysis 405 is routed to social analytics engine social analytics engine 502. The social analytics engine 502 analyses buzzword and sentiment of the user in the post or comments posted by them. The social analytic engine 502 comprises of preprocessor engine 502*a*, buzz analysis engine 502*b* and sentiment analysis engine 502*c*. For the purpose processor 502*a* may be a key phrase extractor or an annotation engine, 502*a*. Buzzword analysis engine 502*b* identifies key phrases being discussed in the contents posted by the users on the social networking sites. This may also form the cluster of identified phrases based upon the key words. Buzzwords are the key phrases being discussed in the contents posted by the users on the social networking sites. These are key words which represent the theme of the discussion. The key words comprises of the words describing or identifying a plurality of attributes of the products including but not limited to product features, cost, brands and technical description. The extracted buzz and the identified sentiment for the given post are persisted in the datamart 503 along with post and it's attributes. Further the key words extracted by processor 502*a* are identified by sentiment analysis engine 502*c* for analyzing sentiment of the user around the key words in the post or comments by the users. Sentiment analysis engine 502*c* uses plurality of approach including hybrid approach of natural language processing and machine learning.

Figure 6:
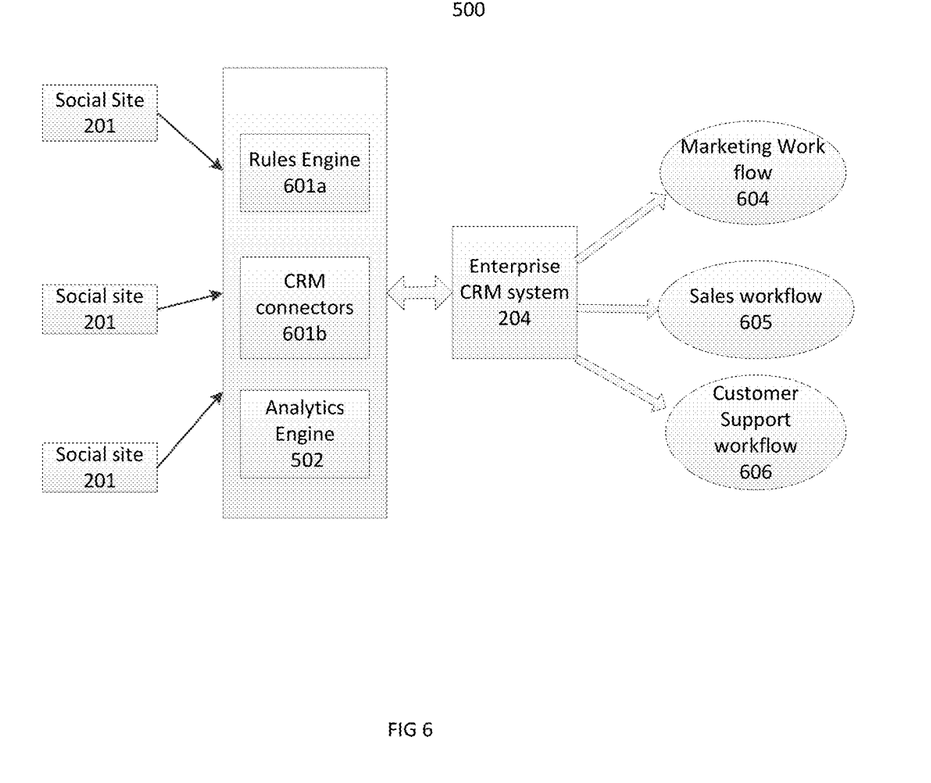
FIG. 6 shows an exemplary architecture for integration with enterprise customer relation management system.

FIG. 6 shows an exemplary architecture for integration of social sites with enterprise customer relation management (CRM) system. According to an embodiment the enterprise customer relationship management system is source of information about customers. Workflows in the enterprise comprising lead generation, customer support and campaign management are modeled in the enterprise CRM system 204. Information from social networks can be pushed to the enterprise CRM system on need basis. The information comprises of customer feedback and users detail which can be used for further follow up and tracking for purpose of identification, classification and response to the customers. Customer identification module 203 is connected to the enterprise CRM system. This connection provides access to the customer credentials. Further it facilitates pushing the information from the social media channels into the enterprise CRM system on need basis. The information from social media comprises of customer feedback or users details and can be further followed up and tracked if required. Analytics derived by Analytics Engine 502 along with rules engine 601*a* facilitate automated information push into the enterprise CRM system 204 with CRM connectors 601*b*. The derived analytics enables filtering out un-necessary data entering into the enterprise CRM system. The module 203 can also be configured to push the social media channels information into CRM system manually. The classified information pushed into the enterprise CRM system 204 can be pushed into different workflows in the enterprise for response management. The exemplary workflows comprise of marketing workflow 604, sales workflow 605 and customer support workflow 606. The routing of classified information to the concerned workflow in the enterprise facilitates correct and specified response to the customers.

Figure 7:
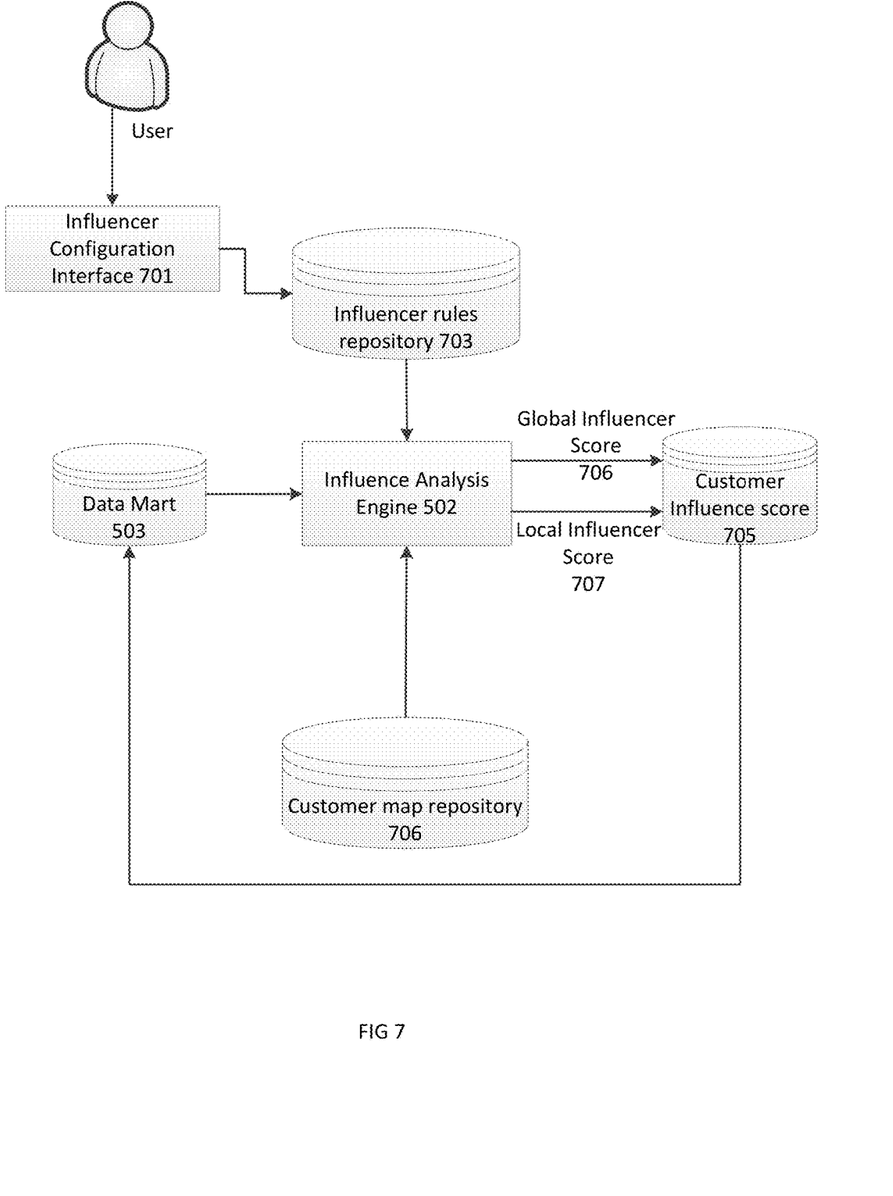
FIG. 7 shows an exemplary architecture for analyzing influence score of the customer.

FIG. 7 shows an exemplary architecture for analyzing influence score of the customer. Rules engine 601*a* may be leveraged to calculate the influence score. For the purpose the influence criteria is defined. The rules can include calculation of global influence score as well as local influencer score. According to an embodiment global influencer score denotes weighted average of influence score of the user of the post across the multiple social media channels as per weightage assigned to the social media channel. According to an embodiment a weight can be assigned to the social media channels. The social media channels include but are not limited to Internet forums, Weblogs, social blogs, micro blogging, wikis, podcasts, photographs or pictures, video, rating, and social bookmarking. Further local influence of the user is specific to a particular social media channel and shows the influence of the user in that particular channel.

Furthermore influence score of a user is based upon the nature of the social media channel. The information is aggregated by social profile aggregator 202 across social media channels. To calculate the influence score a plurality of factors are taken into consideration comprising frequency of activity and volume of posts by the user; responses to the post from other users, response includes comments, visits and like for the post; propagation of posts across network levels, reference of the user or the users post in other posts, influence of the other users connected to the first user; and nature and relevance of the topic or content posted by the user. The text is continuously scanned by a software monitor to look for words and phrases from the database.

Figure 8:
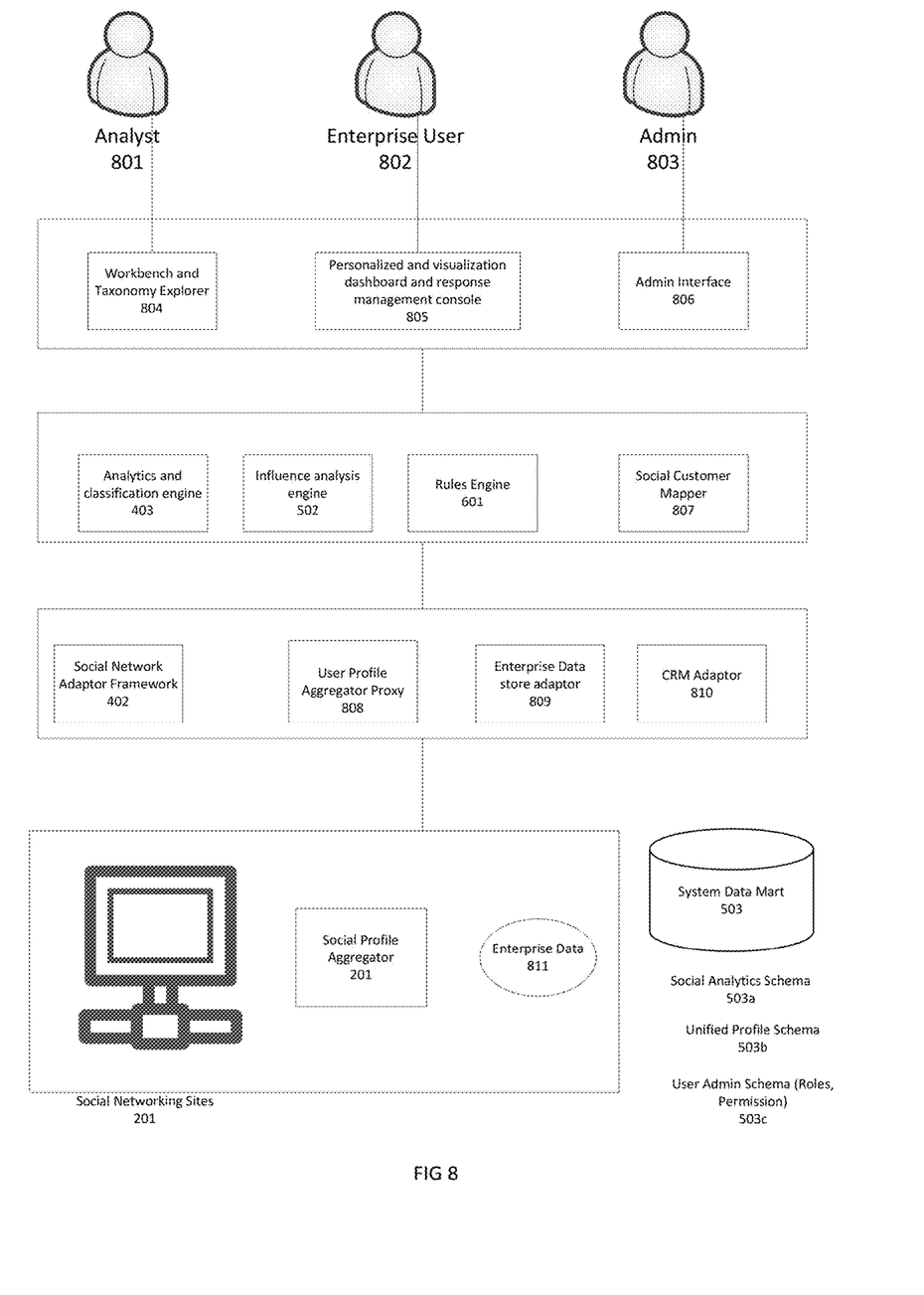
FIG. 8 shows exemplary architecture of the system for categorizing and prioritizing social media conversation for customer response management.

According to an embodiment response management helps in engaging with relevant influencers and customers and can be involved at least an interaction with the user on the same social networking site where the user has posted the comments or from the enterprise CRM site. The prioritized posts from social media needing response from the enterprise can be viewed through the dashboard interface. The posts from the users who have been identified as customers can be integrated with the existing enterprise CRM system workflow for response management. Alternatively the response management for a non-customer whose influencer score is high can be managed through response management console. Response management console is an application where an agent can monitor and respond to the live conversations from social media. These live conversations are analyzed, prioritized, routed and presented to the agent using the proposed system. It can even be a mobile app. This is also role based. The users not identified as the customers with low influencer score may be ignored and the enterprise need not spend time and effort responding to such category of social media posts. Further alerting mechanism from classification and analytics engine 601*c* may be leveraged for prioritized response management. The response management console would have an interface for viewing alerts for response as per defined prioritization. Further the response management console enables the enterprise user to 802 to respond directly back to the social networking sites or to push posts from the customers into the enterprise CRM system for response.

FIG. 8 shows exemplary architecture of the system for categorizing and prioritizing social media conversation for customer response management. According to an embodiment the analytical system comprises of multiple end users including but not limited to analyst 801, enterprise end user 802 and system administrator 803. The analyst 801 may be involved in plurality of functions including but not limiting to business functions, campaigning brands and products for the enterprise, defining topics for analysis and data source for the analysis and configuring the rules for identifying the influencer as per enterprise criteria. The rules may include a plurality of criteria comprising assigning weightages to the social networking sites wherein weightage is assigned on reputation and relevancy of the social networking sites, weightage to site-specific parameters comprising number of responses to the users post and user profile information weightage. Site specific parameters may vary from site to site. Further enterprise end user 802 includes but is not limited a plurality of business functions including marketing business function, sales business function, brand management group, brand campaigning group and group responsible for product management. According to an embodiment dash board interface may be personalized in accordance with the enterprise end user's requirement depending on the business functionality the enterprise end user belongs to. The Personalized visualization dashboard 805 comprises of role based dash board. The personalized visualization dash board 805 enables the enterprise end user to view the social media conversation relevant to the products, brands or campaigns to which the enterprise end users have access. Further the system administrator 803 maps roles and permissions for the enterprise end users in accordance with the requirements for classification and response management.

The system administrator 803 uses admin interface 806 for mapping roles and permissions.

Figure 9:
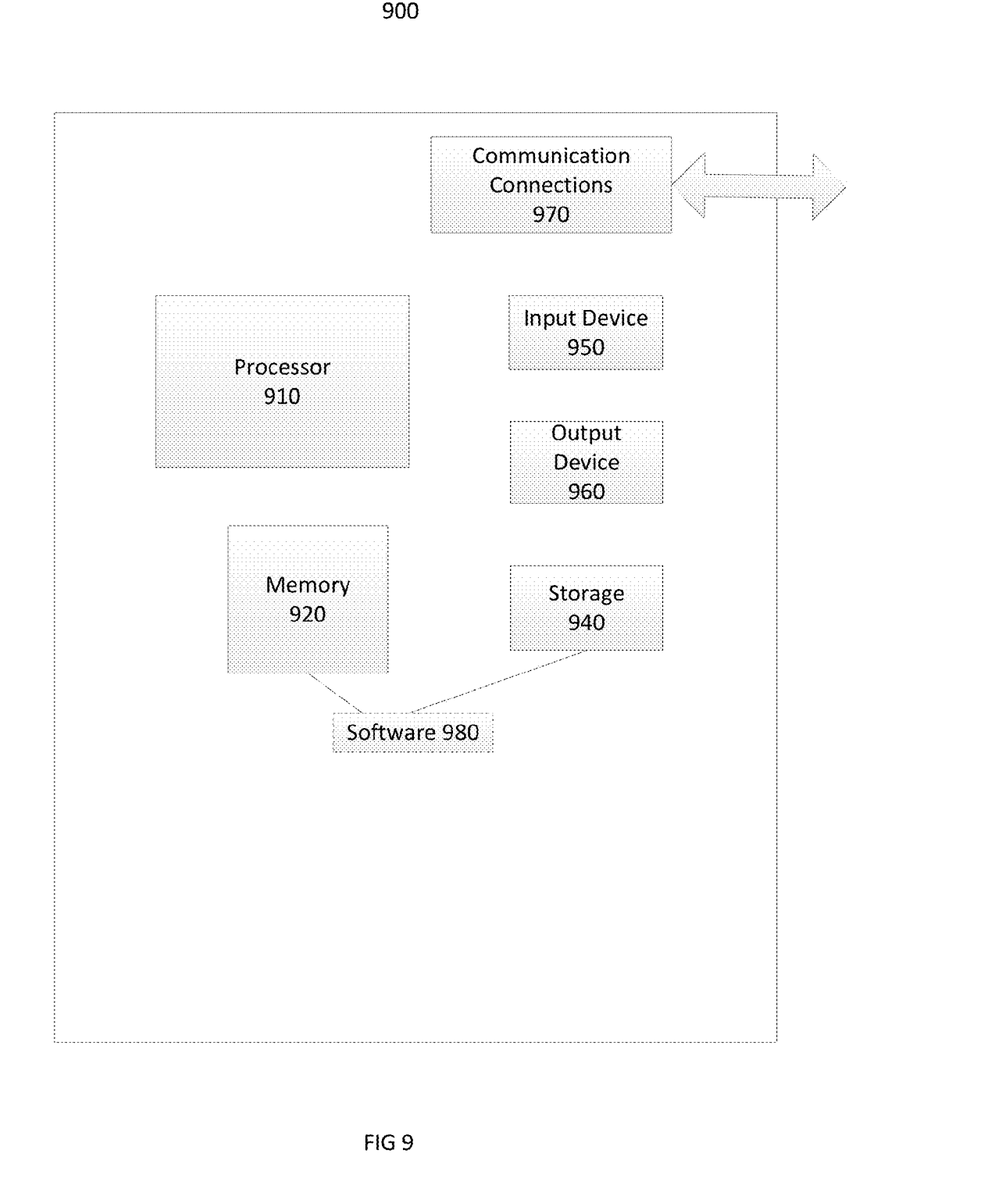
FIG. 9 shows an exemplary computing environment.

FIG. 9 shows an exemplary computing environment. One or more of the above-described techniques can be implemented in or involve one or more computer systems. FIG. 9 illustrates a generalized example of a computing environment 900. The computing environment 900 is not intended to suggest any limitation as to scope of use or functionality of described embodiments.

With reference to FIG. 9, the computing environment 900 includes at least one processing unit 910 and memory 920. The processing unit 910 executes computer-executable instructions and may be a real or a virtual processor. In a multi-processing system, multiple processing units execute computer-executable instructions to increase processing power. The memory 920 may be volatile memory (e.g., registers, cache, RAM), non-volatile memory (e.g., ROM, EEPROM, flash memory, etc.), or some combination of the two. In some embodiments, the memory 920 stores software 980 implementing described techniques. Further the memory 920 across multiple servers is clustered to replicate cache data.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900. An operating system controls all the hardware components.

The storage 940 may be removable or non-removable, and includes hard disks, magnetic disks, magnetic tapes or cassettes, CD-ROMs, CD-RWs, DVDs, flash memory card, modem, router or any other medium which can be used to store information and which can be accessed within the computing environment 900. In some embodiments, the storage 940 stores instructions for the software. Further it is designed to handle large amount of program data, cache offload and to run any complimentary or supporting software for the main software for implementing the described invention.

The input device(s) 950 may be a touch input device such as a keyboard, mouse, pen, trackball, touch screen, or game controller, a voice input device, a scanning device, a digital camera, or another device that provides input to the computing environment 900. The output device(s) 960 may be a display, printer, speaker, or another device that provides output from the computing environment 900.

The communication connection(s) 970 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 900, computer-readable media include memory 920, storage 940, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A computer implemented method executed by one or more computing devices for customer response management, the method comprising:

collecting, by at least one of the one or more computing devices, at least information from a first social networking site of a plurality of social networking sites, wherein the information comprises at least a post or comment by an individual for at least a brand or a product;

comparing at least one social networking site identity of the individual with customer profile information stored in a customer profile repository, the customer profile repository comprising one or more social networking site identities for each of a plurality of customers;

based on the comparing, determining that the individual is a customer;

categorizing by at least one of the one or more computing devices, the information into at least a complaint, lead, service request, information request or feedback by analyzing the information with a machine learning component trained to recognize at least one category, the at least one category comprising complaints, information requests, or feedback, the machine learning component being trained with a mathematical model of, and for, the at least one category;

analyzing, by at least one of the one or more computing devices, the categorized information by classifying the information using a taxonomy to link the categorized information to the at least a brand or product;

prioritizing, by at least one of the one or more computing devices, the analyzed information based at least in part on at least one of a reputation and relevancy weighting for the first social networking site, an influence score for the individual, and a category associated with the at least a post or comment; and routing, by at least one of the one or more computing devices, the prioritized information to at least a concerned personnel or a work flow of a Customer Relationship Management (CRM) system for response, wherein routed information for a plurality of at least a post or a comment is displayed to the concerned personnel, or by CRM system, according to priorities associated with the plurality of at least a post or a comment.

2. The method of claim 1, wherein the customer profile repository comprises information from at least the Customer Relationship Management (CRM) system or a social profile aggregator service.

3. The method of claim 1, wherein the prioritizing is based at least in part on the influence score for the individual, the method further comprising:

calculating the influence score of the individual based on a weighting defined for the plurality of social networking sites, wherein the weighting is assigned at least in part based on reputation and relevancy of the plurality of social networking sites, a number of responses to the information, or profile information of the individual.

4. The method of claim 1, wherein analyzing the categorized information further comprises identifying one or more key words in the categorized information, the one or more key words comprising a word describing an attribute of the at least a brand or a product.

5. The method of claim 1 wherein analyzing the categorized information further comprises identifying a sentiment in the categorized information by analyzing the categorized information using natural language processing and machine learning.

6. The method of claim 1, the method further comprising:
determining a number of responses to the at least a post or comment;
wherein prioritizing the analyzed information is based at least in part on the number of responses.

7. The method of claim 1, wherein the categorization is further done on at least the influence score of the individual or a sentiment of the post.

8. The method of claim 1, wherein the influence score of the individual is at least a global influence or a local influence.

9. The method of claim 8, wherein the global influence is the influence of the individual on the plurality of social networking sites, a plurality of internet forums, or a combination of the plurality of social networking sites and one or more internet forums.

10. The method of claim 8, wherein the local influence of the individual is the influence of the individual on a social networking site of the plurality of social networking sites or an internet forum and is calculated at least in part based on one or more of a frequency of activity of the individual, a volume of posts by the individual, responses to the at least a post or comment by other users of the social networking site or internet forum, propagation of the at least a post or comment, a number of times the at least a post or comment was accessed, and an influence of other users of the social networking site or internet forum connected to the individual.

11. The method of claim 1, further comprising:
responding to the individual at least on the first social networking site or through the CRM system.

12. A system for customer response management the system comprising:
one or more processors; and
one or more memories operatively coupled to at least one of the one or more processors and having instructions stored thereon that, when executed by at least one of the one or more processors, cause at least one of the one or more processors to perform operations comprising:
collecting at least information from a first social networking site of a plurality of social networking sites wherein the information is at least a post or comment by an individual;
comparing at least one social networking site identity of the individual with customer profile information stored in a customer profile repository, the customer profile repository comprising one or more social networking site identities for each of a plurality of customers;
based on the comparing, determining whether the individual is a customer;
categorizing the information into at least a complaint, information request or feedback by analyzing the information with a machine learning component trained to recognize at least one category;
analyzing the categorized information by classifying the information using a taxonomy to link the categorized information to at least a brand or product;
prioritizing the analyzed information; and
routing the prioritized information to at least a concerned personnel or a Customer Relationship Management (CRM) system for response.

13. The system of claim 12, the operations further comprising:
aggregating a plurality of social media profiles of the individual.

14. The system of claim 12, the operations further comprising:
mapping a social media site profile of the individual to an enterprise identity of the individual, wherein the mapping is based at least in part on an e-mail ID or a social networking profile name of the individual.

15. The system of claim 12, the operations further comprising:
calculating the influence score of the individual, wherein the influence score is calculated based on a weightage defined for the plurality of social networking sites and the weightage is assigned based on at least reputation and relevancy of the plurality of social networking sites, a number of responses to the information, or profile information of the individual.

16. The system of claim 12, the operations further comprising:
grouping a plurality of posts by users of the first social networking site into a conversation based at least in part on a keyword, the keyword being associated with the at least a post or comment.

17. The system of claim 12, wherein an enterprise identity of the individual is stored in a repository within an enterprise network.

18. The system of claim 12, further comprising a database to store at least a metadata, categorized content for visualization, a profile of the individual, and the influence score of the individual.

19. At least one non-transitory computer-readable medium storing computer-readable instructions that, when executed by one or more computing devices, cause at least one of the one or more computing devices to:
collect at least information from a first social networking site of a plurality of social networking sites wherein the information is at least a post or comment by an individual for at least a brand or product;
compare at least one social networking site identity of the individual with customer profile information stored in a customer profile repository, the customer profile repository comprising one or more social networking site identities for each of a plurality of customers;
based on the comparing, determining that the individual is a customer;
categorize the information into at least a complaint, information request or feedback by analyzing the information with a machine learning component trained to recognize at least one category, the at least one category comprising complaints, information requests, or feedback, the machine learning component being trained with a mathematical model of, and for, the at least one category;
calculate an influence score of the customer, wherein the influence score is calculated based on weightage defined for the plurality of social networking sites, wherein the weightage is assigned on at least reputation and relevancy of the plurality of social networking sites, a number of responses to the information, or profile information of the customer;
analyze the categorized information by identifying one or more key words in the categorized information, the one or more key words comprising a word describing an attribute of the at least a brand or product;
assign a priority to the analyzed information based at least in part on at least one of a reputation and relevancy weighting for the first social networking site, an influence score for the individual, and a category associated with the at least a post or comment; and
route the prioritized information to at least a concerned personnel or a Customer Relationship Management (CRM) system for response, wherein routed information for a plurality of at least a post or a comment is displayed to the concerned personnel, or by the CRM system, according to priorities associated with the plurality of at least a post or a comment.

20. The at least one non-transitory computer-readable medium of claim 19, wherein the at least one category comprises a plurality of categories, the plurality of categories comprising complaints, information requests, and feedback, the machine learning component being trained with a mathematical model of, and for, each of the plurality of categories.

* * * * *